N. B. WALES.
HEATING APPARATUS.
APPLICATION FILED JAN. 4, 1907.
940,567.
Patented Nov. 16, 1909.
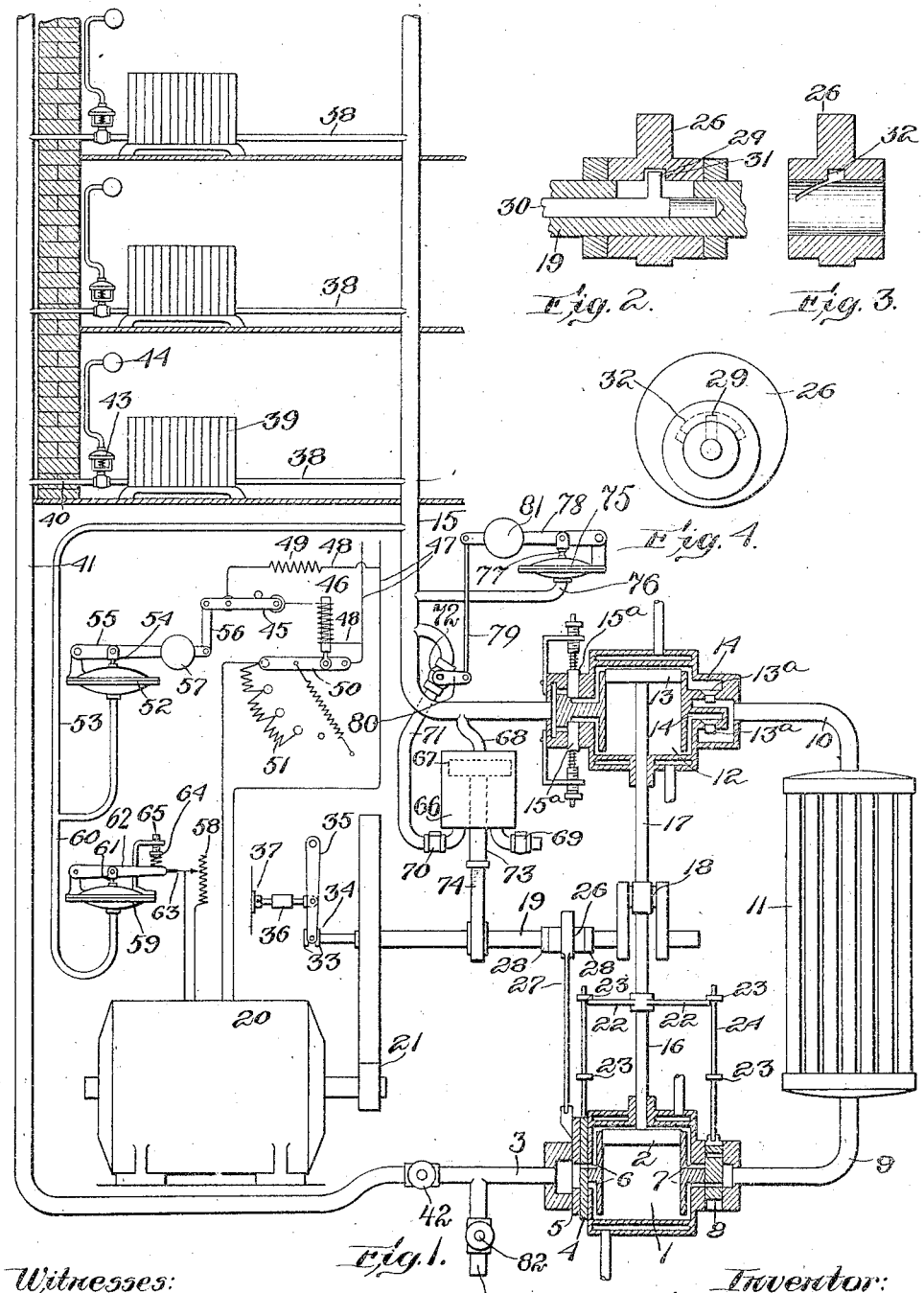
Witnesses:
K. A. Dugan
Geo. N. Goddard
Inventor:
Nathaniel B. Wales
by
Ira L. Fish
Attorneys.

UNITED STATES PATENT OFFICE.

NATHANIEL B. WALES, OF BRAINTREE, MASSACHUSETTS.

HEATING APPARATUS.

940,567.     Specification of Letters Patent.     Patented Nov. 16, 1909.

Application filed January 4, 1907. Serial No. 350,737.

*To all whom it may concern:*

Be it known that I, NATHANIEL B. WALES, a citizen of the United States, and resident of Braintree, county of Norfolk, Massachusetts, have invented certain new and useful Improvements in Heating Apparatus, of which the following is a specification.

The invention relates to a heating apparatus in which the heat conveying or circulating medium is an elastic fluid such as air and in which the temperature of the fluid is raised to the degree required by first expanding the fluid and then compressing it, heat being supplied to the fluid between its admission to the expanding mechanism and its admission to the compressing mechanism so that the heating of the fluid is effected by doing a comparatively small amount of work thereon.

It is the object of the invention to provide for so controlling the operation of the expanding and compressing mechanisms by the pressure in the system to which the compressed fluid is delivered that the pressure may be maintained under the varying conditions of use with a minimum expenditure of power by the mechanism or motor which drives the expanding and compressing mechanisms.

A further object of the invention is to provide for so controlling the expanding and compressing mechanisms that any desired temperature or temperatures may be automatically maintained at different points as for instance in different rooms which are to be heated by the system.

The various features of the invention may be embodied in systems in which the air or other heat conveying fluid delivered from the compressing mechanism is discharged directly into the rooms or spaces to be heated or in systems in which the air is circulated through radiators or heating devices and in the latter systems the air circulated through the radiators or heating devices may or may not be returned to the expanding mechanism to be again circulated through the system.

For the purpose of illustration I have shown diagrammatically in the accompanying drawings an arrangement of apparatus embodying the features of my invention.

The various features of the invention will be readily understood from the following detailed description of this apparatus and will be more particularly set forth in the claims.

In the drawings—Figure 1 is a diagrammatic view indicating a heating system constructed and controlled in accordance with my invention. Figs. 2, 3 and 4 are details of devices for varying the amount of compression effected in the apparatus to satisfy the conditions under which it is being run.

In practicing my invention as shown in the drawings the driving mechanism for the expanding and compressing mechanisms is controlled by the pressure in the conduit or system to which the compressed air is delivered by the compressing mechanism in such manner as to maintain a substantially constant pressure (that is to say a pressure which does not vary beyond predetermined limits) in the conduit or system.

As shown in the drawings the expanding and compressing mechanisms are driven by an electric motor and the control of the expanding and compressing mechanisms is effected by controlling the starting and stopping of the motor or controlling the speed of the motor or by controlling both the starting and stopping and the speed of the motor.

In the apparatus shown in the drawings the expanding mechanism is in the form of a cylinder 1 within which a piston 2 reciprocates and to which the air is supplied through a pipe 3. The supply of air to the opposite sides of the piston is controlled by a main valve 4 and a cut-off valve 5 which are operated to open and close the supply ports 6 at proper intervals. The valves are so constructed and operated that during the travel of the piston in either direction air will be taken in back of the piston for a portion of its stroke and then the cut-off valve will be operated to cut off the supply of air so that during the remainder of the stroke the air back of the piston will expand. During this stroke of the piston the air in front of the piston which has been expanded during the stroke in the opposite direction, will be delivered through one of the delivery ports 7 which remains open during the entire stroke of the piston. The delivery ports 7 are opened and closed at proper intervals by a valve 8.

The cylinder 1 may be jacketed as indicated in the drawings and a heating agent may be circulated through the jacket so that the air in expanding will absorb heat and be delivered from the expanding mechanism at a temperature above that at which it would otherwise have been delivered.

The expanded air is conducted from the expanding cylinder 1 to a compressing mechanism through pipes 9 and 10 and an interposed series of pipes 11. During its passage from the expanding to the compressing mechanism heat is supplied to the air and for this purpose the bank of pipes 11 may be arranged where the temperature of the surrounding air is higher than the temperature of the expanded air. In case the temperature of the air as it comes from the expanding mechanism is below the temperature of the atmosphere, heat may be supplied to the air from the atmosphere as it passes through the bank of pipes. Under some conditions it may be found desirable and economical to surround the pipes 11 with a heating agent such as exhaust products of combustion or other waste products containing heat.

The compressing mechanism illustrated consists of a cylinder 12 within which a piston 13 reciprocates. The supply of air from the pipe 10 to the cylinder 12 is controlled through valves 13$^a$ and ports 14. During the movement of the piston 13 in one direction air from the pipe 10 enters the cylinder back of the piston during its entire stroke. When the piston moves in the opposite direction the valve 13$^a$ for that end of the piston closes and the air in front of the piston is compressed until the pressure in front of the piston is sufficient to open the delivery valve 15$^a$ for that end of the cylinder when the compressed air is delivered through this valve into the pipe 15 by which it is conducted to the place where it is to be used for heating purposes. The compression cylinder may be jacketed if found desirable and a heating agent circulated through this jacket from which heat may be absorbed by the compressed air.

The pistons 2 and 13 are connected by piston rods 16 and 17 with the same crank 18 in such manner that the expanding stroke of the piston 2 occurs during the compression stroke of the piston 13. This reduces the power required for operating the mechanism since the expansion of the air in the expanding mechanism tends to drive the piston of the compressing mechanism during its compression stroke.

The crank 18 is connected with a driving shaft 19 and the compressing and expanding mechanisms are driven by an electric motor 20 connected with the driving shaft 19 through suitable gearing indicated at 21.

In order that the apparatus may be regulated or adjusted to vary the amount of compression to suit the varying conditions under which the apparatus may be used, means are provided for regulating the cutting off of the supply of air to the expansion cylinder. By this means the amount of expansion is varied and consequently the amount of compression required in the compressing mechanism to compress the air to a given pressure. The temperature range through which the air is raised therefore may be varied in accordance with the temperature conditions of the atmosphere at the time of use and according to the temperature to which it is desired to raise the air in the apparatus.

The devices indicated in the drawings for operating the valves and varying the cut off are as follows. The main supply valve 4 as well as the exhaust valve 8 of the expansion cylinder, are shifted at each end of the stroke of the piston 2 by means of tappet arms 22 secured to the piston rod 16 and arranged to alternately engage collars 23 secured to the valve rods 24. The cut-off valve 5 is operated by an eccentric 26 connected with the valve by an eccentric strip and rod 27. The eccentric is loosely mounted on the crank shaft 19 between collars 28. The eccentric is connected to revolve with the shaft by means of a lug 29 formed on the end of a rod 30 which is mounted within the shaft 19. The lug projects radially through a slot 31 in the shaft and engages a spiral groove 32 formed in the bore of the eccentric. So long as the rod 30 remains in a fixed position longitudinally of the shaft the eccentric will remain in fixed relation to the shaft, thus operating the cut-off valve to cut off the supply of air to the expansion cylinder at a definite point in the stroke of the piston. If the rod 30 is shifted longitudinally of the shaft the lug 29 working in the spiral groove 32 will shift the eccentric about the shaft thus varying the point of cut off. The rod 30 projects beyond the end of the shaft 19 and is connected by means of collars 33 and pin 34 with one end of a lever 35. The lever 35 is connected by means of an adjustable link 36 with a fixed pivot 37 so that by adjusting the length of the link 36 the position of the rod 30 longitudinally of the shaft may be varied, thus varying the position of the eccentric and the cut-off of the expanding cylinder.

In the apparatus or system shown in the drawings the conduit or pipe 15 to which the compressed air is delivered by the compressing mechanism is connected by branch pipes 38 with a series of radiators 39 indicated as arranged in different rooms and in turn connected through pipes 40 with a return pipe 41 which communicates with the intake pipe 3 of the expansion cylinder through a valve 42. The delivery of air through the heating devices 39 to the discharge pipes 40 is controlled by valves 43 the opening and closing of which may be effected manually or may be automatically controlled by thermostats 44 as indicated.

So long as all of the valves 43 which control the delivery of air from the pipe 15 remain closed there will be no discharge of air from the pipe 15 and disregarding leakage the pressure in the pipe will be maintained even if the compressing mechanism remains at rest. Should any of the valves 43 be open however there will be a flow of air from the pipe 15 through the corresponding radiator 39 and into the return pipe 41. If a substantially constant pressure is to be maintained in the pipe 15 or in the system the expanding and compressing mechanism should therefore remain out of action so long as all of the valves 43 remain closed but should be started into action when any one of the valves is open in order to supply hot air to the pipe 15 and to the radiator corresponding to the open valve or valves. In case only a few radiators or heating devices are to be supplied from the conduit 15 a substantially constant pressure might be effectively maintained by thus throwing the expanding and compressing mechanism in and out of action, the mechanisms being thrown into action whenever the pressure within the pipe 15 fell by reason of the opening of one or more of the valves and the mechanisms being thrown out of action when sufficient compressed heated air had been supplied to the pipe 15 to supply the air delivered through the open valves and to restore the pressure in the pipe 15 to normal. In case however there are a large number of radiators or heating devices supplied from the pipe 15 then the pressure within the system may be more effectively and economically maintained by varying the speed of the expanding and compressing mechanisms in such manner that these mechanisms will be started at a slow speed sufficient to supply the quantity of air which would be delivered from the pipe 15 in case one or two valves 43 were open and the speed will be increased should the pressure in the pipe 15 continue to fall by reason of an insufficient supply of air to the pipe 15 or by reason of the opening of an increasing number of the valves.

In systems in which there is a constant delivery of air from the conduit to which the compressed air is delivered but in which the quantity required to be delivered may vary a constant pressure may be maintained within the conduit by varying the speed of the expanding and compressing mechanisms and in such case the throwing of the expanding and compressing mechanisms into and out of action automatically may be omitted.

In the construction shown in the drawings the operation of the expanding and compressing mechanisms is controlled by both automatically throwing these mechanisms into and out of action and automatically varying the speed of their operation so that the expanding and compressing mechanisms are thrown into operation whenever the pressure in the conduit or system falls by reason of the opening of one or more of the valves through which air is delivered from the conduit, the speed of operation of the expanding and compressing mechanisms being varied according to the number of valves which are open. The throwing of the expanding and compressing mechanisms into and out of action is effected by a starting and stopping mechanism which controls the starting and stopping of the electric motor 20 which drives these mechanisms. This starting and stopping mechanism may be of any suitable construction and one form of such mechanism is indicated in the drawings. As shown the starting and stopping of the motor is effected through a switch 45 which opens and closes the circuit through the coil of a solenoid 46. The current is supplied to the solenoid circuit from the feed wires 47 of the motor through shunt wires 48 and resistance 49 connected to the pivot of the switch. When the circuit is closed by the switch 45 the solenoid 46 operates an arm 50 of a switch which completes the connection between the motor and the feed wires through a rheostat 51 in a well known manner.

The opening and closing of the switch 45 is controlled by the pressure within the conduit 15 through a diaphragm (not shown) arranged within the casing 52 and subjected upon its under side to the pressure within the pipe 15 through a pipe 53 leading from the pipe 15 to a chamber formed within the casing 52 beneath the diaphragm. The diaphragm is connected by a pin or plunger 54 with a lever 55 pivoted to the casing 52 and connected at its free end with the switch 45 through a link 56. The lever carries a weight 57 which may be adjusted to counterbalance any given pressure upon the under side of the diaphragm within the casing 52 and consequently to counterbalance any given pressure within the pipe 15.

By these devices just described the starting and stopping of the motor and of the expanding and compressing mechanisms is controlled by the pressure within the conduit 15 and within the system. If the pressure within the pipe 15 falls by reason of the opening of one or more of the valves 43 the pressure on the diaphragm within the casing 52 falls so that the lever 55 swings downward thus operating the switch 45 to close the solenoid circuit and to cause the starting of the motor. When the pressure within the pipe 15 is restored the pressure on the diaphragm within the casing 52 swings the lever 55 upward thus operating the switch 45 to open the solenoid circuit and thus stop the motor.

In the construction shown the variation in the speed of operation of the expanding and compressing mechanisms is effected by varying the speed of the motor and any suitable form of speed changing devices may be employed for this purpose. One form of such speed changing mechanism is indicated in the drawings in which 58 indicates a resistance included in the circuit through which the field magnets are excited and which may be varied in any well known manner to vary the speed of the motor. The speed of the motor and consequently of the expanding and compressing mechanisms is controlled by the pressure within the pipe 15 and system by means of a diaphragm (not shown) arranged above a chamber formed in a casing 59. The chamber below the diaphragm is connected through a pipe 60 with the pipe 53 which leads from the conduit 15 to the casing 52 heretofore referred to. The diaphragm within the casing 59 is connected by a pin 61 with the lever 62 pivoted to the casing and connected at its free end with a contact 63 by the movement of which the resistance 58 is varied. The lever 61 is held against the pressure exerted on the under side of the diaphragm by means of a spring 64 the tension of which may be adjusted by a screw 65.

When the expanding and compressing mechanisms are started into action they are driven at a comparatively slow speed which should be sufficient to maintain the pressure within the conduit and system when only a small proportion of the valves 43 are open. If the pressure within the conduit and system continues to fall the supporting pressure upon the diaphragm within the casing 59 diminishes and the lever 62 is moved to operate the contact 63 and thus vary the resistance 58 to increase the speed of the motor and of the expanding and compressing mechanisms. This increase in speed will continue until the mechanisms are being driven at their full capacity or until the pressure in the system is maintained. Should the pressure within the system rise the speed of the motor and expanding and compressing mechanisms will be decreased until the minimum speed is reached. This speed will continue so long as it is sufficient to maintain the pressure in the system. If the pressure in the system rises until it overbalances the pressure exerted on the diaphragm within the casing 52 by the weight 57 then the switch 45 will be operated to stop the motor and the expanding and compressing mechanisms.

In case the valves 43 are controlled by thermostats any desired temperature may be automatically maintained in each of the rooms and the apparatus be automatically controlled to economically supply the amount of air required according to the number of valves which are open.

In case the air which is delivered from the conduit 15 is returned to the expanding mechanism after passing through the heating devices to be again passed through the system, it is desirable that some means be provided for supplying fresh air to the system to compensate for any leakage or loss which may occur. Any suitable form of devices for effecting this purpose may be employed and one form of such device which is automatically controlled to supply fresh air to the system whenever by reason of leakage or loss the pressure within the system falls below a predetermined point, is shown in the drawings. This device comprises a cylinder 66 within which reciprocates a piston 67. The upper end of the cylinder is connected by means of a pipe 68 with the conduit 15 which leads from the compressing mechanism to the heat using devices of the system. The lower end of the cylinder communicates through an intake valve 69 with the atmosphere and communicates through a delivery valve 70 with a pipe 71 which leads from the conduit 15. The pipe 71 is provided with a valve 72 which serves to open and close communication between the end of the cylinder and the conduit 15. The piston 67 is connected with a piston rod 73 the upper end of which is arranged to be acted upon by a cam 74 secured to the shaft 19.

By reason of the fact that the piston rod 73 is connected to the under side of the piston 67 the effective area of the upper side of the piston is greater than the effective area of the under side of the piston and a given pressure below the piston will therefore cause the air above the piston to be compressed to a higher pressure. Assuming that the valve 72 is open the operation of the device will be as follows. On the up stroke of the piston air will be drawn in through the valve 69, the valve 70 being held closed by the pressure within the system. As the cam 74 releases the piston the pressure on the upper side of the piston will force it downward, the valve 69 closing to prevent the escape of air from below the piston. The air below the piston will therefore be compressed until the pressure is greater than the pressure within the system when the valve 70 will open and the air below the piston be forced into the system through the pipe 71. On the next up stroke of the piston the valve 70 will close and the valve 69 will open to allow a fresh supply of air to enter the lower end of the cylinder below the piston when the operation will be repeated. Thus so long as the valve 72 remains open the pump will operate to supply air to the system and to build up the pressure therein. When the valve is closed the piston 67 will be forced upward to the upper end of its stroke each time the cam 74 revolves and when released by the cam will return until the pressure within the lower end of the cylinder and pipe 71 balances the pressure above the piston when the piston will remain at rest until again depressed by the cam.

The device for opening the valve 72 and thus throwing the compressing device into operation when the pressure within the system falls below a certain amount compresses a casing 75 which is connected by means of a pipe 76 with the conduit 15 leading from the compressing mechanism. Within the casing 75 is a diaphragm (not shown) which is connected by means of a link 77 with a lever 78. The lever is connected by means of a link 79 with an operating arm 80 which is connected with the valve 72. An adjustable weight 81 is mounted upon the lever 78 and this weight may be adjusted to regulate the pressure required to operate the diaphragm and through it to operate the lever 78.

In adjusting the apparatus for any given conditions the weight 81 is so adjusted that the lever 78 will be supported in raised position by the pressure on the under side of the diaphragm in the casing 75 so long as predetermined pressure is maintained in the conduit 15. This pressure should be equal to or slightly below the pressure which is maintained in the system when the expanding and compressing mechanisms are being operated at full speed. Should the pressure in the conduit 15 fall below this predetermined pressure the lever 78 will be moved downward by the weight 81 thus operating the valve 72 and opening communication between the lower end of the cylinder 66 and the conduit 15. Air will now be forced into the system until the pressure in the conduit 15 is restored when the lever 78 will be raised to close the valve 72. Thus the requisite quantity of air will be automatically maintained in the system and fresh air supplied to compensate for any leakage.

In starting the system in the first instance after it has been adjusted to suit the conditions under which it is to be used and after the valves 15ª have been adjusted for the pressure which it is desired to maintain in the conduit 15 and system the valve 42 is closed and a valve 82 is open. The valve 82 is mounted in a pipe 83 which leads from the atmosphere to the intake pipe 3 of the expansion cylinder. When the valve 82 is open therefore and the valve 42 closed the intake pipe of the expansion cylinder is in communication with the atmosphere and is cut off from communication with the return pipe 41 of the system. The expanding and compressing mechanisms are now run until the desired pressure is secured in the conduit 15 and in the system and then the valve 82 is closed and the valve 42 open.

It will be understood that the construction of the expanding and compressing mechanisms and of the various other devices and mechanisms shown in the drawings are shown for the purpose of illustration merely and that the illustration is to a great extent diagrammatic.

Without attempting to point out in detail the various constructions and arrangements in which the features of the invention may be embodied, what I claim and desire to secure by Letters Patent is:—

1. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanisms, a conduit to which the fluid is delivered from the compressing mechanism and from which it is delivered to the expanding mechanism, and devices for controlling the driving mechanism by the pressure in the conduit.

2. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanisms, a conduit to which the fluid is delivered from the compressing mechanism provided with a plurality of delivery outlets, valves for controlling said outlets, and devices for controlling the driving mechanism by the pressure in the conduit.

3. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanisms, a conduit provided with a plurality of delivery outlets, valves for controlling said outlets, a separate thermostat for controlling each valve, and devices for controlling the driving mechanism by the pressure in the conduit.

4. A heating apparatus comprising a fluid expanding mechanism, a fluid compressing mechanism, means for supplying heat to the fluid between its admission to the expanding mechanism and its admission to the compressing mechanism, a conduit to which the fluid is delivered from the compressing mechanism, mechanism for varying the speed of the expanding and compressing mechanisms controlled by the pressure in the conduit.

5. A heating apparatus comprising a fluid expanding mechanism, a fluid compressing mechanism, means for supplying heat to the fluid between its admission to the expanding mechanism and its admission to the compressing mechanism, a conduit to which the fluid is delivered from the compressing mechanism and from which it is delivered to the expanding mechanism, mechanism for throwing the expanding and compressing mechanisms into and out of operation controlled by the pressure in the conduit.

6. A heating apparatus comprising a fluid expanding mechanism, a fluid compressing mechanism, means for supplying heat to the fluid between its admission to the expanding mechanism and its admission to the compressing mechanism, a conduit to which the fluid is delivered from the compressing mechanism provided with a plurality of delivery outlets, valves for controlling said outlets, and mechanism for varying the speed of the expanding and compressing mechanisms in accordance with the number of valves open.

7. A heating apparatus comprising a fluid expanding mechanism, a fluid compressing mechanism, means for supplying heat to the fluid between its admission to the expanding mechanism and its admission to the compressing mechanism, a conduit to which the fluid is delivered from the compressing mechanism provided with a plurality of delivery outlets, valves for controlling said outlets, a thermostat for controlling each valve, and mechanism for varying the speed of the expanding and compressing mechanisms in accordance with the number of valves open.

8. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanisms, a conduit to which the fluid is delivered from the compressing mechanism provided with a plurality of delivery outlets, valves for controlling said outlets, and mechanism controlling the driving mechanism to maintain a substantially constant pressure in the conduit.

9. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanisms, a conduit to which the fluid is delivered from the compressing mechanism provided with a plurality of delivery outlets, valves for controlling said outlets, a separate thermostat for controlling each valve, and mechanism controlling the driving mechanism to maintain a substantially constant pressure in the conduit.

10. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanisms, a conduit to which the fluid is delivered from the compressing mechanism provided with a plurality of delivery outlets, valves for controlling said outlets, and devices for throwing the driving mechanism into and out of operation and for varying the speed of the driving mechanism controlled by the pressure in the conduit.

11. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanisms, a conduit to which the fluid is delivered from the compressing mechanism provided with a plurality of delivery outlets, valves for controlling said outlets, a thermostat for controlling each valve, and devices for throwing the driving mechanism into and out of operation and for varying the speed thereof controlled by the pressure in the conduit.

12. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanism, a conduit to which the fluid is delivered from the compressing mechanism and from which it is delivered to the expanding mechanism, devices for supplying fresh fluid to the conduit to compensate for leakage, and devices for controlling the driving mechanism by the pressure in the conduit.

13. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanisms, devices acting to automatically supply fresh fluid to the system when the pressure in the conduit falls below a predetermined point, and devices for controlling the driving mechanism by the pressure in the conduit.

14. A heating apparatus comprising a fluid expanding mechanism, a fluid compressing mechanism, means for supplying heat to the fluid between its admission to the expanding mechanism and its admission to the compressing mechanism, mechanism for driving said expanding and compressing mechanism, a conduit to which the fluid is delivered from the compressing mechanism provided with a plurality of delivery outlets, devices acting to automatically supply fresh fluid to the system when the pressure in the conduit falls below a predetermined point, and devices for controlling the driving mechanism by the pressure in the conduit.

15. A heating apparatus comprising a fluid expanding mechanism, a fluid compressing mechanism, means for supplying heat to the fluid between its admission to the expanding mechanism and its admission to the compressing mechanism, a conduit to which fluid is delivered from the compressing mechanism and from which it is delivered to the expanding mechanism, and mechanism for varying the speed of the expanding and compressing mechanism controlled by the pressure in the conduit.

In witness whereof, I have hereunto set my hand, this 2nd day of January 1907.

NATHANIEL B. WALES.

In the presence of—
 IRA L. FISH,
 KATHARINE A. DUGAN.